United States Patent
Kuskov et al.

(10) Patent No.: US 11,709,938 B2
(45) Date of Patent: *Jul. 25, 2023

(54) SYSTEM AND METHOD OF CATEGORIZATION OF AN APPLICATION ON A COMPUTING DEVICE USING A CLASSIFIER

(71) Applicant: AO Kaspersky Lab, Moscow (RU)

(72) Inventors: Vladimir A. Kuskov, Moscow (RU); Nikita A. Buchka, Moscow (RU); Anton A. Kivva, Moscow (RU); Oleg P. Volkov, Moscow (RU); Dmitry Y. Lukasevich, Moscow (RU); Evgeny A. Roginsky, Moscow (RU); Konstantin M. Filatov, Moscow (RU); Dmitry V. Latokhin, Moscow (RU)

(73) Assignee: AO Kaspersky Lab, Moscow (RU)

( * ) Notice: Subject to any disclaimer, the term of this patent is extended or adjusted under 35 U.S.C. 154(b) by 0 days.

This patent is subject to a terminal disclaimer.

(21) Appl. No.: 17/680,605

(22) Filed: Feb. 25, 2022

(65) Prior Publication Data
US 2022/0179957 A1 Jun. 9, 2022

Related U.S. Application Data

(63) Continuation of application No. 16/654,434, filed on Oct. 16, 2019, now Pat. No. 11,295,016.

(51) Int. Cl.
*G06F 21/00* (2013.01)
*G06F 21/56* (2013.01)
*H04W 12/128* (2021.01)

(52) U.S. Cl.
CPC .......... *G06F 21/567* (2013.01); *G06F 21/568* (2013.01); *H04W 12/128* (2021.01); *G06F 2221/033* (2013.01)

(58) Field of Classification Search
CPC ................. G06F 21/567; G06F 21/568; G06F 2221/033; G06F 21/50; H04W 12/128
See application file for complete search history.

(56) References Cited

U.S. PATENT DOCUMENTS 7,831,412 B1 * 11/2010 Sobel .................. G06F 11/3476
702/179
9,324,034 B2 * 4/2016 Gupta .................... G06N 5/043
(Continued)

OTHER PUBLICATIONS

Schultz et al., "Data mining methods for detection of new malicious executables", Proceedings 2001 IEEE Symposium on Security and Privacy, Date of Conference: May 14-16, 2000 (Year: 2001).*

*Primary Examiner* — Morshed Mehedi
(74) *Attorney, Agent, or Firm* — ArentFox Schiff LLP; Michael Fainberg

(57) ABSTRACT

Disclosed herein are systems and methods for categorizing an application on a computing device including gathering a set of attributes of an application. The set of attributes of the application includes at least one of: a number of files in an application package of the application; a number of executable files in the application package; numbers and types of permissions being requested; a number of classes in the executable files in the application package; and a number of methods in the executable files in the application package. sending the gathered set of attributes to a trained classification model. The application is classified, using the classification model, based on the gathered set of attributes by generating one or more probabilities of the application belonging to respective one or more categories of applications. A category of the application is determined based on the generated one or more probabilities.

21 Claims, 4 Drawing Sheets

(56) References Cited

U.S. PATENT DOCUMENTS

| | | |
|---|---|---|
| 9,438,631 B2 | 9/2016 | Bettini et al. |
| 2012/0227105 A1* | 9/2012 | Friedrichs ............ H04L 63/1416 726/22 |
| 2012/0240236 A1* | 9/2012 | Wyatt .................... G06F 21/564 726/25 |
| 2013/0205366 A1* | 8/2013 | Luna ...................... H04L 63/101 726/1 |
| 2015/0286820 A1* | 10/2015 | Sridhara ................ G06F 1/3206 713/320 |
| 2015/0356451 A1* | 12/2015 | Gupta .................... G06F 21/552 706/46 |
| 2017/0012912 A1 | 1/2017 | Narayan et al. |
| 2020/0019311 A1* | 1/2020 | Zolotow ................. G06F 3/067 |
| 2020/0279139 A1* | 9/2020 | Collins ................ G06F 21/6218 |
| 2020/0410100 A1* | 12/2020 | Kuskov ................. G06F 21/568 |

* cited by examiner

SYSTEM AND METHOD OF CATEGORIZATION OF AN APPLICATION ON A COMPUTING DEVICE USING A CLASSIFIER

CROSS REFERENCE TO RELATED APPLICATIONS

This application is a continuation of prior U.S. patent application Ser. No. 16/654,434, filed Oct. 16, 2019, which claims priority to Russian Patent Application No. 2019120230, filed on Jun. 28, 2019, the entire content of each of which is incorporated herein by reference.

FIELD OF TECHNOLOGY

The present disclosure relates to the field of detecting malicious applications on computing devices using a remote server.

BACKGROUND

The broad popularity of computing devices, including mobile ones, is opening vast prospects for criminals to conduct cyberattacks, for example, with the use of malicious software. By gaining unlawful access to computing devices of a user, criminals can gain access to confidential data of the user, and to correspondence of the user. Using the unlawfully accessed content, criminals are able to perform actions in the name of users, including actions for conducting financial transactions. Thus, often specialized software—e.g., antivirus software—is used to protect users of devices.

Modern antivirus software frequently works in tandem with a remote infrastructure, within which every possible service operates. For example, the remote infrastructure may be used for services which provide data, such as data regarding whether an application belongs to a certain category. For instance, upon request from antivirus software, the remote infrastructure may provide data indicating of whether or not an application belongs to a certain category. Such services reduce the burden on the computing device of the user by taking over labor-intensive computing tasks, such as image recognition or classification of objects (files, applications, and so forth) using a number of criteria.

However, this approach has its shortcomings. A large number of antivirus applications hooked up to a remote server create a heavy burden on the services of the remote infrastructure. Incidentally, many of the requests from antivirus applications installed on various devices are identical. Namely, vast numbers of requests are to obtain information about the category of the very same applications or files. In order to avoid running identical tasks on a remote infrastructure for each time a request is received, caching services may be used for remembering results of previously performed tasks. Although, this approach somewhat reduces the computing burden, the result is an increase in errors of both the first and second kind (false positives and false negatives). As such, the above approaches have shortcomings.

Thus, there is a need for a more optimal way of detecting malicious applications while eliminating the need for increasing computational resources and while reducing errors in classification of applications.

SUMMARY

Aspects of the disclosure relate to the field of information security, more specifically to systems and methods for categorizing an application.

In one exemplary aspect, a method for categorizing an application on a computing device is implemented in a computer comprising a hardware processor, the method including gathering a set of attributes of an application. The set of attributes of the application includes at least one of: a number of files in an application package of the application; a number of executable files in the application package; numbers and types of permissions being requested; a number of classes in the executable files in the application package; and a number of methods in the executable files in the application package. sending the gathered set of attributes to a trained classification model. The application is classified, using the classification model, based on the gathered set of attributes by generating one or more probabilities of the application belonging to respective one or more categories of applications. A category of the application is determined based on the generated one or more probabilities.

According to one aspect of the disclosure, a system is provided for categorizing an application on a computing device, the system comprising a hardware processor configured to: gather a set of attributes of an application. The set of attributes of the application includes at least one of: a number of files in an application package of the application; a number of executable files in the application package; numbers and types of permissions being requested; a number of classes in the executable files in the application package; and a number of methods in the executable files in the application package. sending the gathered set of attributes to a trained classification model. The application is classified, using the classification model, based on the gathered set of attributes by generating one or more probabilities of the application belonging to respective one or more categories of applications. A category of the application is determined based on the generated one or more probabilities.

In one exemplary aspect, a non-transitory computer-readable medium is provided storing a set of instructions thereon for categorizing an application on a computing device, wherein the set of instructions includes instructions for: gathering a set of attributes of an application. The set of attributes of the application includes at least one of: a number of files in an application package of the application; a number of executable files in the application package; numbers and types of permissions being requested; a number of classes in the executable files in the application package; and a number of methods in the executable files in the application package. sending the gathered set of attributes to a trained classification model. The application is classified, using the classification model, based on the gathered set of attributes by generating one or more probabilities of the application belonging to respective one or more categories of applications. A category of the application is determined based on the generated one or more probabilities.

In one aspect, the category of the application is determined using heuristic rules which are based at least in part on the generated one or more probabilities.

In one aspect, the category of the application includes at least one of: a category for malicious applications, a category for unwanted applications, and a category for trusted applications.

In one aspect, determining the category further includes determining the category of the application based on the gathered set of attributes.

In one aspect, the heuristic rules include relevance rules.

In one aspect, the method further includes: when the application is categorized as being malicious, removing the application from the computing device or quarantining the application, and when the application is categorized as being unwanted, performing at least one of: removing the application from the computing device, notifying a user of the computing device of a presence of the unwanted application on the computing device, providing an option to the user of the computing device for selecting either to keep or remove the unwanted application, and revoking permissions previously granted to the application.

In one aspect, the heuristic rules are applied to the gathered set of attributes. Thus, the method of the present disclosure advantageously enables information security of the data.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
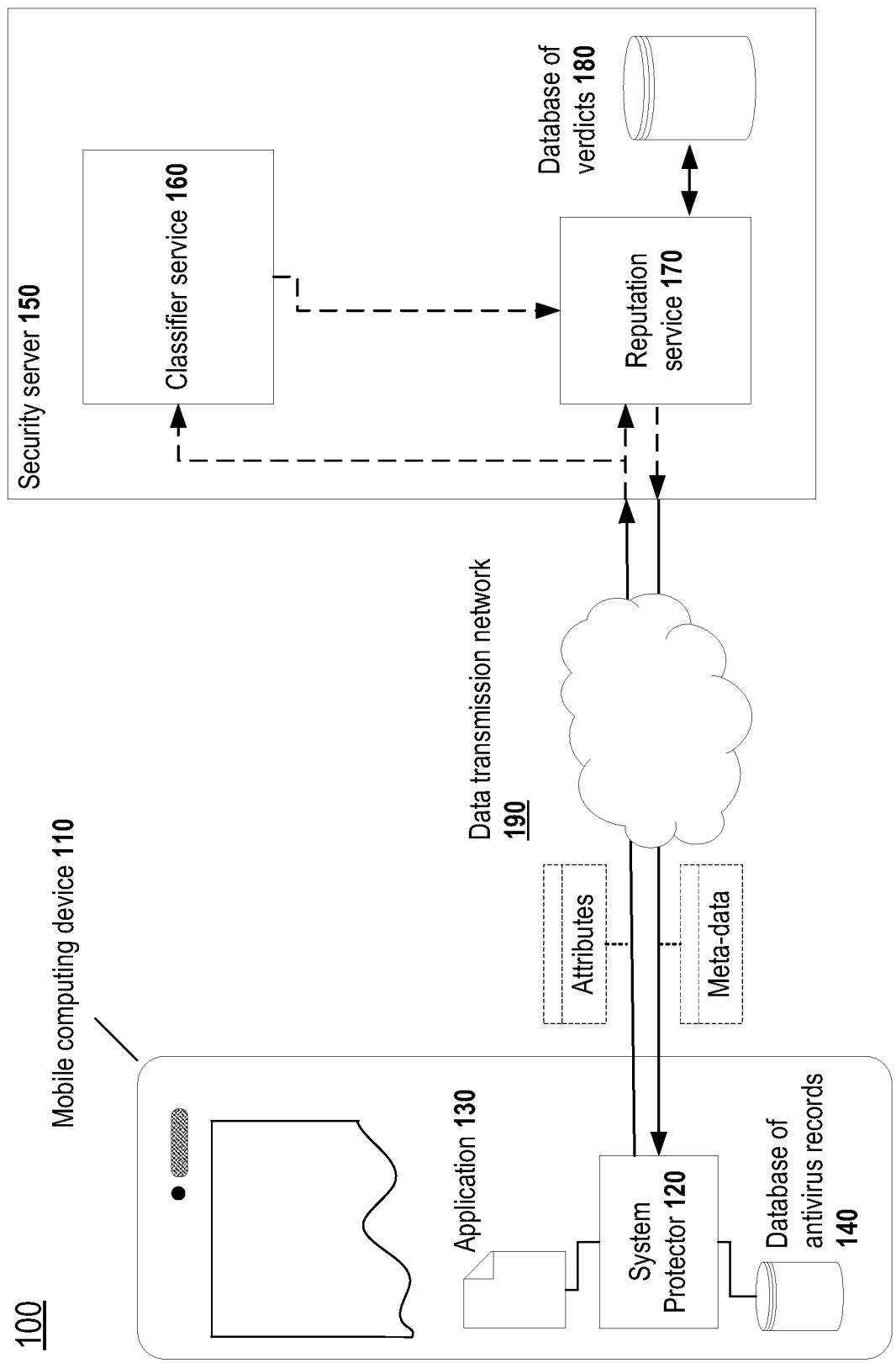
FIG. 1 illustrates an example diagram of a system for categorizing an application on a computing device in accordance with aspect of the present disclosure.

Exemplary aspects are described herein in the context of a system, method, and a computer program for categorizing an application on a computing device without increasing the need for computing resources and without increasing errors in classification of applications. Those of ordinary skill in the art will realize that the following description is illustrative only and is not intended to be in any way limiting. Other aspects will readily suggest themselves to those skilled in the art having the benefit of the disclosure. Reference will now be made in detail to implementations of the example aspects as illustrated in the accompanying drawings. The same reference indicators will be used to the extent possible throughout the drawings and the following description to refer to the same or like items.

In order to present the teachings of the present disclosure with clarity, a number of terms and concepts, as used in describing various aspects of the disclosure, are defined herein.

A malicious application is an application able to cause harm to a computing system or to the data of a user of the computing system (in other words, a computer, a group of computers, personal computer, server, mobile telephone, and so forth), such as: an Internet worm, a keyboard logger, a computer virus. The harm caused may be unlawful access to the resources of the computer, including the data being kept on the computer, for the purpose of theft, as well as unlawful use of the resources, including for storage of data, performing computations, and so on.

A trusted application is an application which does not cause harm to a computing system or to a user of the computing system. A trusted application may comprise an application which has been developed by a trusted software manufacturer, downloaded from a trusted source (such as a site listed in a database of trusted sites), or an application whose identifier (or other data by which the application can be uniquely identified, for example, the hash value of the file of the application) is kept in a database of trusted applications. The identifier of the manufacturer, such as a digital certificate, may also be kept in the database of trusted applications.

An unwanted application is an application which is neither malicious nor trusted. Furthermore, such an application is able to carry out unlawful access to the resources of a computer, including the data kept on the computer, although the compromising of such data does not cause direct harm either to the computer or to the user of the computer. An example of an unwanted application may be advertising software, which is able to collect data from a user's device and/or display advertising materials to the user via the device.

An untrusted application is an application which is neither trusted nor wanted, but also is an application that is not categorized as being harmful, for example, with the aid of an antivirus application. Furthermore, an untrusted application may afterwards be categorized as malicious, for example, with the aid of an antivirus scan.

A malicious file is a file which is a component of a malicious application, and contains a program code (e.g., an executable or interpretive code).

An untrusted file is a file which is a component of an untrusted application, and contains a program code (e.g., an executable or interpretive code).

A trusted file is a file which is a component of a trusted application.

An unwanted file is a file which is a component of an unwanted application and which contains program codes (executable or interpretable code).

The category of an application is a characteristic of an application defining an affiliation of the application with one of: a category of trusted applications (the application is trusted), a category of malicious applications (the application is malicious), or a category of unwanted applications (the application is unwanted).

A relevance rule is a rule containing requirements for results of a classification, wherein satisfying these requirements reduces probabilities (and consequently also the number) of errors of the first and second kinds in results of classifications. The probabilities are computed as a numerical value.

A result of a classification of an application is a probability of the application belonging to given categories of applications.

In one aspect, the present disclosure describes a system for categorizing an application on a computing device without increasing the need for computing resources and without increasing errors in classification of applications that is implemented on a computing system (e.g., a server, computer, etc.), that includes real-world devices, systems, components, and groups of components realized with the use of hardware such as integrated microcircuits (application-specific integrated circuits, ASICs) or field-programmable gate arrays (FPGAs) or, for example, in the form of a combination of software and hardware such as a microprocessor system and set of program instructions, and also on neurosynaptic chips. The functionality of such means of the system may be realized solely by hardware, and also in the form of a combination, where some of the functionality of the system means is realized by software, and some by hardware. In certain aspects, some or all of the components, systems, etc., may be executed on the processor of a general-purpose computer (such as the one shown in FIG. 4). Furthermore, the system components may be realized either within a single computing device or spread out among several interconnected computing devices.

FIG. 1 illustrates an example diagram of a system 100 for categorizing an application on a computing device in accordance with aspect of the present disclosure.

The system 100 for categorizing an application comprises a system protector 120 and classifier service 160 implemented on a security server 150. In one aspect, the system protector 120 is implemented on a computing device of a user, for instance, on a mobile computing device 110 of a user. Without loss of generality, the term "mobile computing device" is used in describing the teachings of the present disclosure. In other words, the method may be deployed on any standard computing device and the usage of the term "mobile computing device" is not intended to limit the benefit of the current disclosure only to mobile devices. Rather, a user of any computing device, mobile or otherwise, may benefit from the teachings of the present disclosure.

In one aspect, the security server 150 further comprises a reputation service 170. Moreover, the reputation service 170 may be communicatively coupled to a database of verdicts 180 which may also be implemented on a security server 150. It should be noted that the security server 150 may be embodied either as a single computing device or as several interconnected computing devices, linked for example, by a data transmission network 190, each of which may be either a physical or a virtual computing device.

In one aspect, the mobile computing device 110 further comprises a database of antivirus records 140. In one aspect, the system protector 120 is communicatively coupled to the database of antivirus records 140. An antivirus record, e.g., stored in the database 140, comprises a formalized set of data used by antivirus software (or analogous systems such as the system protector 120) to determine a category of an application, such as for detection of a malicious application.

In one aspect, the mobile computing device 110 comprises an application 130. In one aspect, the application 130 may be an application downloaded from the Internet through a data transmission network 190, for instance, from an application store (e.g., from an App store, Google Play, and so forth). In another aspect, the application 130 may be obtained in other ways, e.g., via a removable storage medium or a Bluetooth connection. In order to ensure the security of the mobile computing device 110, the system protector 120 is deployed on the device 110.

In one aspect, the system protector 120 gathers a set of attributes for application 130. In one aspect, the set of attributes which may be gathered by the system protector 120, on behalf of the application 130, comprises:
  a number of files in an application package of application 130;
  a number of executable files in the application package;
  numbers and types of permissions being requested;
  a number of classes in the executable files; and
  a number of methods in the executable files.

In one aspect, the application package of application 130 may comprise a container for files of application 130. For example, the application package may comprise an APK archive, which is designed for running an application on a mobile computing device under control of an Android operating system, a ZIP archive, or any other standard based container.

In one aspect, the executable file comprises a DEX file, which is designed for execution of devices under the control of the Android operating system.

In one aspect, the executable file comprises another file containing instructions for execution (which may include usage of interpreters) by the computing device.

In one aspect, a request for permission is an indication of the application 130 performing certain actions on the mobile computing device 110, wherein the actions for which the permission is being requested require a definite consent of the user of the mobile computing device 110. Some examples of actions that require definite permission include: access to a data transmission network, access to a digital camera, access to a microphone, and so forth. The permissions that are requested by a given application 130 may be described in a file, which may be part of the application package of application 130.

In one aspect, information about classes and methods being used by the executable code of the application 130 may be formalized as an attribute of the application 130 using any method ordinarily known in art of data structure. For example, the attributes of the application may be provided in the form of a tree-like structure (list) having various levels:
  Class1
    Method1
    Method2
  Class2
    Method3

The gathered set of attributes of the application 130 may then be sent by the system protector 120 to the security server 150, and specifically to the classification service 160, which resides on the security server 150.

The classification service 160 is designed to classify applications, in particular an application 130, on the basis of a set of attributes of the application.

The result of the classification of the application 130 is presented as a probability of the application 130 belonging to certain categories of applications. For example, the result of a classification of the application 130 may appear as follows: 80% malicious application, 85% unwanted application, 60% trusted application.

In order to obtain the classification results described above, the classification service 160 makes use of previously trained expert classifying systems. In one aspect, the trained classifying systems may be built from: neural nets, decision making tress or ladders, a Bayesian classifier, and/or any other classifier system known in the art.

For the training of the classification service 160, in one aspect, a set of marked applications, whose affiliations with the categories of applications are considered as being known, may be used. In another aspect, the training may also use an additional system protector running on the security server 150. It is noted that the formation of the set of marked applications may be performed by a specialist in the field of information technology or by any expert system known in the art.

Once the classification is completed by the classification service 160, the classification results of the application 130 are sent by the security server 150 to the protection system 120, which is in the mobile computing device 110.

In one aspect, the system protector 120, using the results of the classification of the application 130 received from the classification service 160, determines the category of the application 130. In one aspect, the determination of the category of the application is performed using heuristic rules which are stored in a database of antivirus records 140. In one aspect, the heuristic rules call for determining the category of the application 130 on the basis of the results of the classification of the application 130.

An example of a heuristic rule may appear as follows:
"If for an application the probability of belonging:
to the category of malicious applications is greater than 30%; and
to the category of trusted applications is less than 20%;
then, the application is categorized as being malicious".

In yet another aspect, the system protector 120 uses heuristic rules, e.g., rules stored in the database 140, which are applied not only to the results of the classification of the application 130, but also to a set of additional attributes of the application 130, which may be gathered by the system protector 120.

In one aspect, the set of additional attributes of the application 130 (also referred to simply as "additional attributes") are the very same attributes which were used for classification of the application 130. In another aspect, the set of additional attributes are attributes different from those used by the classification service 160.

An example of the set of additional attributes may be:
a size of the executable file from the application package;
a sequence of instructions of the executable file from the application package.

In one aspect, the system protector 120 determines the category of the application 130 using at least one of: the heuristic rules obtained from the database 140, the results of the classification, and the set of additional attributes.

An example of such a heuristic rule may be: "if the probability of an application belonging to the category of malicious applications is greater than 30%, while the application package has an executable file whose size is 100 kB, and the executable file includes a code that comprises a sequence of three XOR operations, then the application is categorized as malicious".

In one aspect, in addition to the above-described methods, the system protector 120 is also able to make a request to the security server 150 in order to obtain the results of the classification of an application 130, without sending the set of attributes of the application 130 to the server 150. In this case, the request is addressed to the server 150, and specifically to the reputation service 170, which is functioning (operating) within the security server 150, wherein the request itself may contain an identifier of the application 130, such as its name, the checksum of the application package, or any other identifier uniquely characterizing the application 130.

When a request is sent to the reputation service 170, in order to provide the system protector 120 with the results of the classification of the application 130 without the set of attributes of the application 130, the reputation service 170 uses the stored classification results of previously classified applications. The classification results of the previously classified applications are obtained by carrying out, by the classification service 160, classifications using sets of attributes of the previously classified applications which were previously gathered by the system protector 120.

In one aspect, the reputation service 170 utilizes a database of verdicts 180 for the storing of this data. Furthermore, the results of the classifications of the various applications may be stored in the database of verdicts 180 in conjunction with their respective circumstances for obtaining the classification results. For instance, the circumstance may include:
a time stamp of the classification;
an identifier of the application being classified;
a type of an expert classifying system used;
an estimate of an error of the expert classifying system that is used;
a version of the mechanism for gathering attributes used by the system protector (1.0, 1.1, 2.0, 3.0 and so forth); and
a version of the mechanism of the expert classifying system (1.0, 1.1, 2.0, 3.0 and so forth).

The previously obtained results of the classification of applications include the results of classifications performed by the classification service 160 on request from the system protector 120 running on the mobile computing device 110, as well as those from similar protection systems which may be situated either on the computing devices of one or more users or on the security server 150. Such previously classified applications might be applications for which system protectors (residing on both the devices 110 and on the server 150) have gathered sets of attributes and sent the gathered attributes to the classification service 160 in order to obtain the classification results.

In one aspect, such applications are applications from the aforementioned set of marked applications.

Whenever the classification service 160 generates the results of the classification of a certain application (including the application 130), the service 160 may send to the reputation service 170, the classification results. In one aspect, the circumstances for obtaining the classification results is also sent to the reputation service 170. In turn, the reputation service 170 may store the received information in the database of verdicts 180.

The results of the classification of the application 130 provided by the reputation service 170, including the circumstances of the obtaining of the classification results, are sent to the system protector 120 in order to determine the relevance of the classification results (relevance as a property of the information).

In one aspect, the relevance of the classification results is determined by the system protector 120 residing on the mobile computing device 110. In another aspect, the relevance of the classification results is determined by another system protector residing on the security server 150. Thus, the determination of the relevance of the results of the classification of the application 130 may be performed either on the mobile computing device 110 or on the security server 150.

To determine the relevance of the classification of the application 130, the system protector 120 (like any other protection system) uses rules for ascertaining relevance (relevance rules). These relevance rules, may be stored in a database of antivirus records 140, which may contain requirements to be applied to results of the classification of the application 130.

If the results of the classification of the application 130 satisfy the requirements of the relevance rules, then the results of the classification are categorized as being relevant by the system protector 120.

An example of the requirements of a relevance rule may be as follows:
a difference between a time stamp of the classification and a current time stamp is in a specified range of permissible values;
an estimate of an error of an expert classifying system used is not more than 0.5%;
a version of a mechanism of the expert classifying system used to obtain the results of the classification is not lower than a version of the mechanism of the expert classifying system used in the classification service; and
a version of the mechanism of gathering attributes used by the system protector for obtaining the results of the classification is not lower than the version of the mechanism of gathering attributes used in the classification service.

In one aspect, in order for the results of the classification of the application 130 to be designated as relevant, the results of the classification must satisfy at least one relevance rule.

In another aspect, in order for the results of the classification of the application 130 to be designated as relevant, the results of the classification must satisfy all the relevance rules stored in the database of antivirus records 140.

In the event that the system protector 120 does not classify (or designate) the results of the classification of the application 130 as relevant, in one aspect, the system protector 120, in accordance with the above-described possibilities, gathers a set of attributes of the application 130 for sending to the classification service 160, and for subsequently obtaining the results of the classification of the application 130 (for example, in a synchronous mode). The classification results so obtained are considered to be relevant by the system protector 120 (i.e., without a further checking of relevance with the aid of the relevance rules).

Then, in one aspect, the system protector 120 may determine the category of the application 130 using the relevant results of the classification of the application 130.

In one aspect, the above-described scheme is used with heuristic rules, such as rules stored in the database of antivirus records 140.

In yet another aspect, a simplified approach may be used for determining the category of the application 130. For example, the category of the application 130 may be defined as being the category having the highest probability of the application 130 belonging to it based on the results of the classification.

In one aspect, applications categorized as being malicious by the system protector 120 may be removed by the system protector 120 or may be placed in quarantine. In one aspect, applications categorized as being unwanted may also be removed by the system protector 120. In another aspect, when applications are categorized as being unwanted, the protection system 120 may simply notify the user of the mobile computing device 110 of the presence of the unwanted application on the device 110, and/or propose one or more options to the user, e.g., an option whether or not to remove the unwanted application.

In another aspect, the protection system 120 may revoke permissions granted to the application 130 in order to protect the mobile computing device 110 against actions that may be performed by the application 130.

It should be noted that the content of the database of antivirus records 140 and the database of verdicts 180 may be modified by a specialist in the field of information technology. Furthermore, the content of the database 140 may also be modified remotely by command received from the security server 150.

Figure 2:
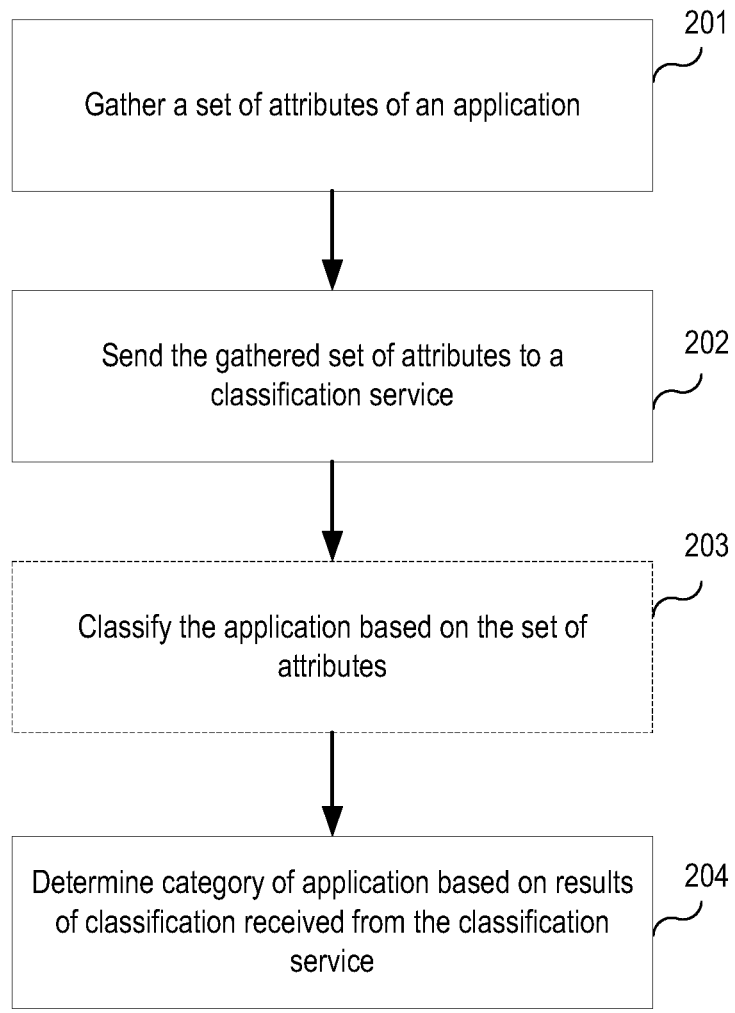
FIG. 2 illustrates a method for categorizing an application using a classifier service in accordance with aspect of the present disclosure.

FIG. 2 illustrates a method 200 for categorizing an application using a classifier service in accordance with the teachings of the present disclosure. The method 200 may be implemented on a computing system that comprises any number of devices, e.g., a computing system 100 that includes the mobile computing device 110 and a security server 150.

In step 201, by the system protector 120 running on the mobile computing device 110 of the user, method 200 gathers a set of attributes of the application 130 present on the device 110.

In step 202, by the system protector 120, method 200 sends the gathered set of attributes to the security server 150, and more precisely to a classification service 160 residing on the security server 150.

In step 203, by the classification service 160 residing on the security server 150, method 200 classifies the application 130 based on the set of attributes received from the system protector 120. In one aspect, the result of the classification comprises: one or more probabilities of the application 130 belonging to respective one or more categories of applications. In one aspect, the categories of applications include: trusted, malicious, and unwanted. The classification results are sent, by the classification service 160, to the system protector 120 residing on the device 110.

In step 204, by the system protector 120, method 200 determines a category of the application based on results of a classification received from the classification service 160.

In one aspect, the determination of the category of the application is further based on attributes of the application 130. In one aspect, the attributes of the application used for determination of the category of the application comprise at least one of: a set of attributes gathered from the application, and a set of additional attributes, the additional attributes being attributes that are not used for the classification of the application 130.

When method 200, as described above, is used for determining the category of the application 130, the results of the classification of the application 130 are refined using the attributes of the application, e.g., using heuristic rules stored locally on the mobile computing device 110. Thus, method 200 advantageously describes both type I and type II errors (false positives and omissions) in categorizing the application 130.

Moreover, the locally stored heuristic rules enable a fast correction of errors by updating the heuristic rules, if and when errors occur. Thus, unlike expert classifying systems that require a complex retraining of the classification algorithm, errors in locally stored heuristic rules can be corrected in a short time and without complicated systems. In other words, updating the heuristic rules locally may be performed as errors are discovered—thereby improving the categorization of the application in a more responsive manner.

It should be noted that, in order to achieve the improvements described above, the system protector 120 may send to the security server 150 any given information regarding the application 130 and the category to which the application was assigned by the system protector 120, which is essential to detection of errors of the first and the second kind by any method ordinarily known in the art. After detecting an error of the first or second kind, the security server 150 (for example with the aid of a system protector 120 running on the server 150) is able to provide the system protector 120 with changes to the heuristic rules. The change to the heuristic rule may comprise a change in to a particular rule or a change for issuing an instruction to delete a rule. The changes to the heuristic rule are made to prevent an erroneous determination of a category of the application 130 when using the modified local heuristic rules from the database 140. Furthermore, the method of the present disclosure achieves a faster correction of errors of the first and second kind when using an expert classifying system for the determination of the category of the application after the correction of the heuristic rules.

Figure 3:
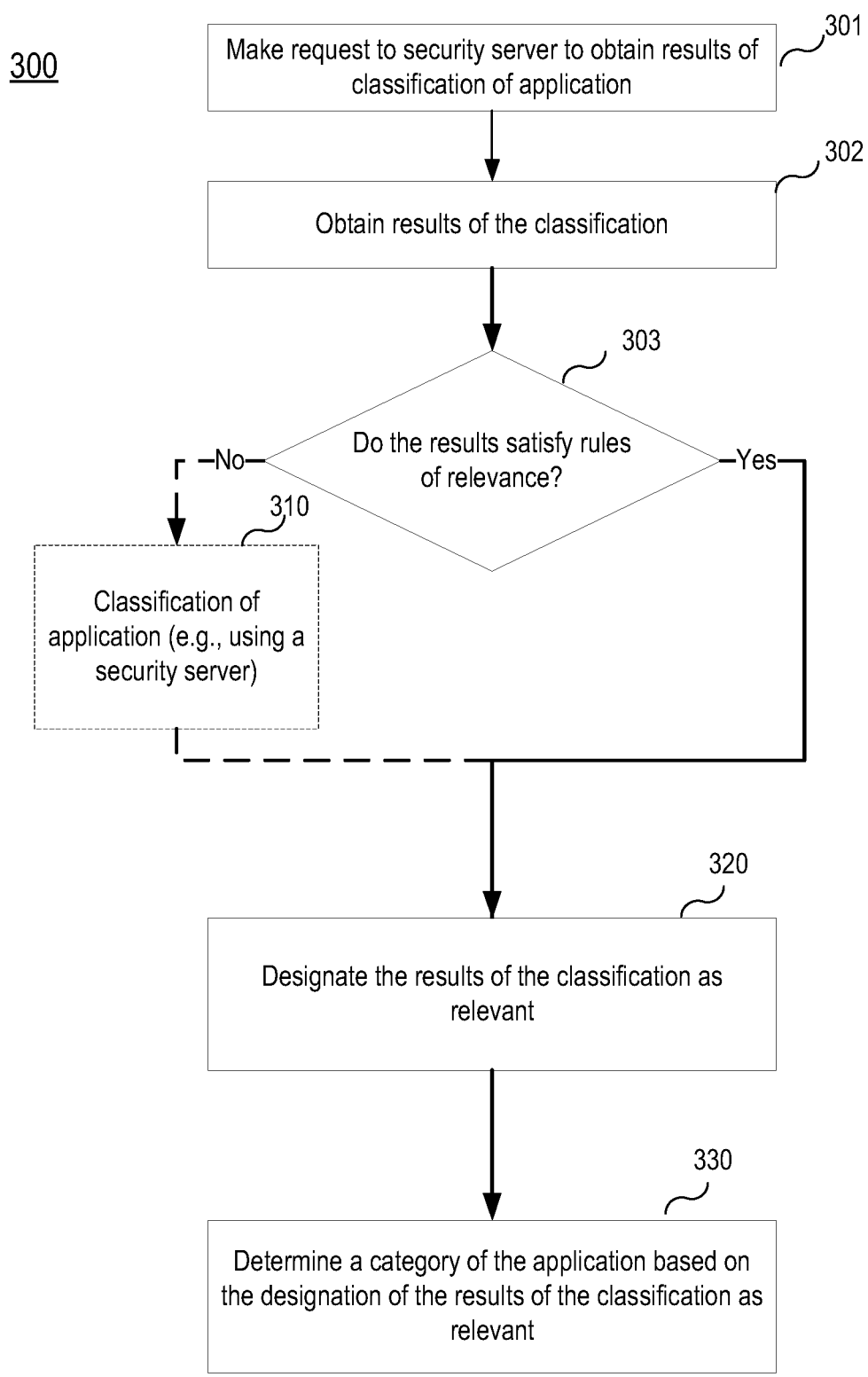
FIG. 3 illustrates a method for categorizing an application on a computing device based on relevance rules in accordance with aspects of the present disclosure.

FIG. 3 illustrates a method 300 for categorizing an application on a computing device based on relevance rules in accordance with the teachings of the present disclosure. The method 300 may be implemented on a computing system that comprises any number of devices, e.g., a computing system 100 that includes the mobile computing device 110 and a security server 150.

In step 301, by the system protector 120, method 300 sends a request to obtain results of a classification of an application 130. In one aspect, the request is sent to a security server 150, particularly to a reputation service 170 residing on the security server 150. The reputation service 170 stores results of classifications of classified applications, i.e., results of previous classifications of any number of applications performed by the classification service 160. The previous classifications are based on sets of previously classified applications collected by the system protector 120.

In step 302, by the system protector 120, method 300 obtains results of the classification of the application 130. For example, the system protector 120 receives the results of the classification from the reputation service 170.

In step 303, by the system protector 120, method 300 determines whether or not the obtained results of the classification of the application 130 are relevant based on relevance rules. When the system protector 120 considers the results of the classification of the application as relevant, method 300 proceeds to step 320. When the system protector 120 does not consider the results of the classification of the application 130 as relevant, in one aspect, the system protector 120 proceeds to step 310, in another aspect, the system protector 120 simply terminates method 300.

In step 310, method 300 performs the steps described in regard to method 200 in conjunction with FIG. 2. Thus, the system protector 120, gathers and sends to the security server 150 a set of attributes of the application 130. Then, the system protector 120 obtains, from the security server 150, updated results from the classification of application 130.

In step 320, by the system protector 130, in one aspect, method 300 may designate the updated results of the classification of the application 130 as relevant based on the relevance rules. The results of the classification of the application 130 that satisfy the relevance rules are deemed as relevant by the system protector 120.

In step 330, by the system protector 120, method 300 determines the category of the application 130 based on the results of the classification that are designated as being relevant.

In one aspect, the updating of the classification comprises receiving the updated classification from a security server in response to sending the set of attributes to the security server.

In one aspect, the set of attributes of the application comprises at least one of: a number of files in an application package of the application, a number of executable files in the application package, numbers and types of permissions being requested, a number of classes in the executable files in the application package, and a number of methods in the executable files in the application package.

In one aspect, the results of the classification of the application are presented as one or more probabilities of the application belonging to respective one or more categories of applications.

In one aspect, the one or more categories of the applications comprise at least one of: a category for malicious applications, a category for unwanted applications, and a category for trusted applications.

In one aspect, the category of the application is determined using heuristic rules which are based at least in part on the results of the classification.

In one aspect, the method further comprises: when the application is categorized as being malicious, removing the application from the computing device or quarantining the application, and when the application is categorized as being unwanted, performing at least one of: removing the application from the computing device, notifying a user of the computing device of a presence of the unwanted application on the computing device, providing an option to the user of the computing device for selecting either to keep or remove the unwanted application, and revoking permissions previously granted to the application.

The method described above is advantageous in terms of reducing the burden on the classification service 160 and consequently also on the security server 150—thereby presenting improvements in results of classifications. Furthermore, determining the relevance of the results of previously performed classifications provided by the reputation service 170, advantageously reduces errors of the first and second kind during the classification of an application 130, and consequently also when determining the category of an application 130, since "obsolete", erroneous and irrelevant classifications will not be used to determine the category of the application 130.

Figure 4:
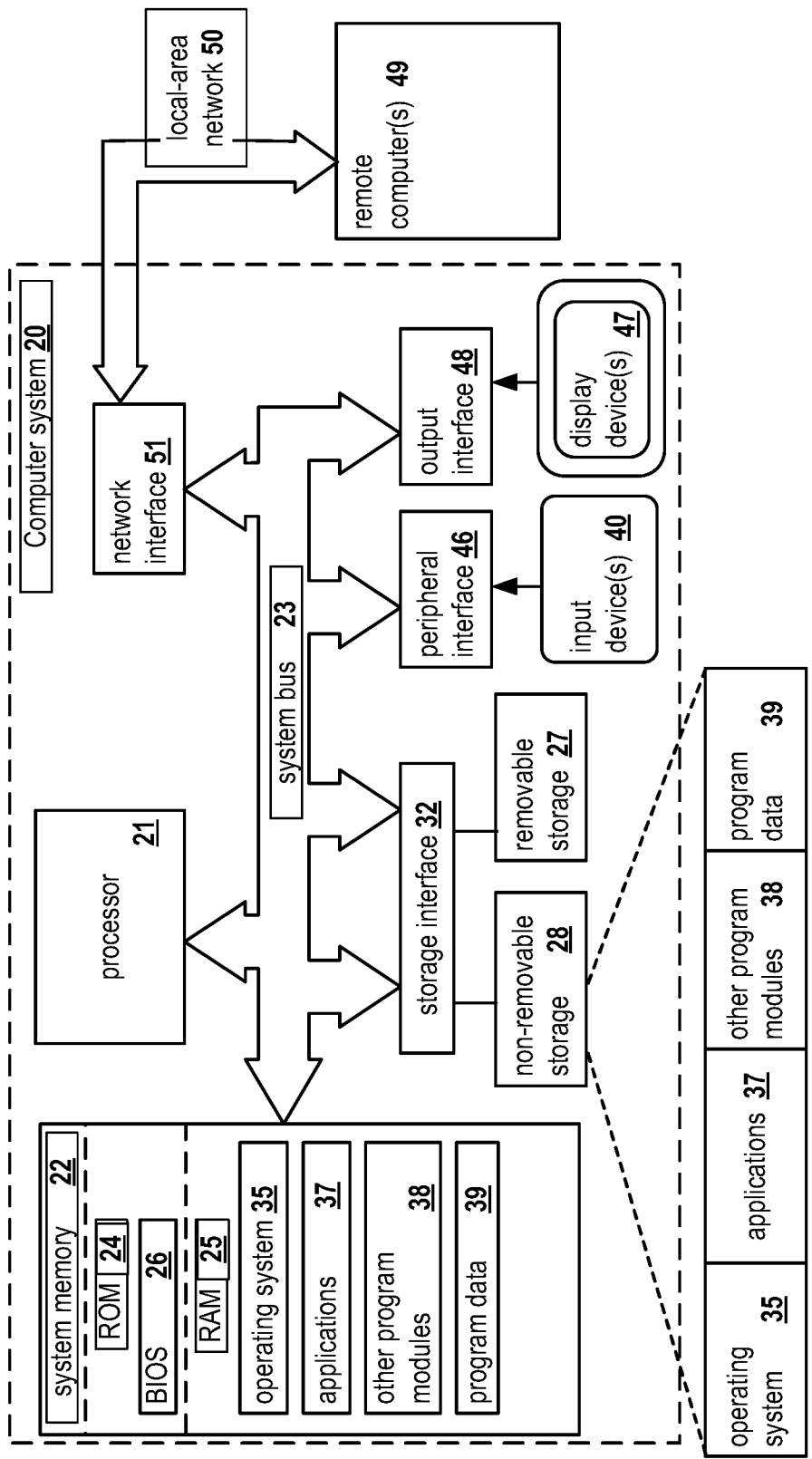
FIG. 4 presents an example of a general purpose computer system on which aspects of the present disclosure can be implemented.

FIG. 4 is a block diagram illustrating a computer system 20 on which aspects of systems and methods categorizing an application on a computing device, may be implemented in accordance with exemplary aspects. It should be noted that the computer system 20 can correspond to a virtual security device 102, for example, as described earlier. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 4, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for categorizing an application on a computing device, the method comprising:
    gathering a set of attributes of an application, wherein the set of attributes of the application comprises at least one of: a number of files in an application package of the application; a number of executable files in the application package; numbers and types of permissions being requested; a number of classes in the executable files in the application package; and a number of methods in the executable files in the application package;
    sending the gathered set of attributes to a trained classification model;
    classifying, using the classification model, the application based on the gathered set of attributes by generating one or more probabilities of the application belonging to respective one or more categories of applications; and
    determining a category of the application based on the generated one or more probabilities and at least one additional attribute comprising at least one of: a size of the executable files from the application package, and a sequence of instructions of the executable files from the application package.

2. The method of claim 1, wherein the category of the application is determined using heuristic rules which are based at least in part on the generated one or more probabilities.

3. The method of claim 1, wherein the category of the application comprises at least one of: a category for malicious applications, a category for unwanted applications, and a category for trusted applications.

4. The method of claim 1, wherein determining the category further comprises determining the category of the application based on the gathered set of attributes.

5. The method of claim 2, wherein the heuristic rules comprise relevance rules.

6. The method of claim 3, further comprising:
    when the application is categorized as being malicious, removing the application from the computing device or quarantining the application; and
    when the application is categorized as being unwanted, performing at least one of: removing the application from the computing device, notifying a user of the computing device of a presence of the unwanted application on the computing device, providing an option to the user of the computing device for selecting either to keep or remove the unwanted application, and revoking permissions previously granted to the application.

7. The method of claim 4, wherein the heuristic rules are applied to the gathered set of attributes.

8. A system for categorizing an application on a computing device, comprising:
    at least one hardware processor configured to:
        gather a set of attributes of an application, wherein the set of attributes of the application comprises at least one of: a number of files in an application package of the application; a number of executable files in the application package; numbers and types of permissions being requested; a number of classes in the executable files in the application package; and a number of methods in the executable files in the application package;
        send the gathered set of attributes to a trained classification model;
        classify, using the classification model, the application based on the gathered set of attributes by generating one or more probabilities of the application belonging to respective one or more categories of applications; and
        determine a category of the application based on the generated one or more probabilities and at least one additional attribute comprising at least one of: a size of the executable files from the application package, and a sequence of instructions of the executable files from the application package.

9. The system of claim 8, wherein the category of the application is determined using heuristic rules which are based at least in part on the generated one or more probabilities.

10. The system of claim 8, wherein the category of the application comprises at least one of: a category for malicious applications, a category for unwanted applications, and a category for trusted applications.

11. The system of claim 8, wherein the processor configured to determine the category is further configured to determine the category of the application based on the gathered set of attributes.

12. The system of claim 9, wherein the heuristic rules comprise relevance rules.

13. The system of claim 10, the processor further being configured to:
    when the application is categorized as being malicious, remove the application from the computing device or quarantine the application; and
    when the application is categorized as being unwanted, perform at least one of: removing the application from the computing device, notifying a user of the computing device of a presence of the unwanted application on the computing device, providing an option to the user of the computing device for selecting either to keep or remove the unwanted application, and revoking permissions previously granted to the application.

14. The system of claim 11, wherein the heuristic rules are applied to the gathered set of attributes.

15. A non-transitory computer readable medium storing thereon computer executable instructions for categorizing an application on a computing device, including instructions for:
  gathering a set of attributes of an application, wherein the set of attributes of the application comprises at least one of: a number of files in an application package of the application; a number of executable files in the application package; numbers and types of permissions being requested; a number of classes in the executable files in the application package; and a number of methods in the executable files in the application package;
  sending the gathered set of attributes to a trained classification model;
  classifying, using the classification model, the application based on the gathered set of attributes by generating one or more probabilities of the application belonging to respective one or more categories of applications; and
  determining a category of the application based on the generated one or more probabilities and at least one additional attribute comprising at least one of: a size of the executable files from the application package, and a sequence of instructions of the executable files from the application package.

16. The non-transitory computer readable medium of claim 15, wherein the category of the application is determined using heuristic rules which are based at least in part on the generated one or more probabilities.

17. The non-transitory computer readable medium of claim 15, wherein the category of the application comprises at least one of: a category for malicious applications, a category for unwanted applications, and a category for trusted applications.

18. The non-transitory computer readable medium of claim 15, wherein determining the category further comprises determining the category of the application based on the gathered set of attributes.

19. The non-transitory computer readable medium of claim 16, wherein the heuristic rules comprise relevance rules.

20. The non-transitory computer readable medium of claim 17, the instructions further comprising instructions for:
  when the application is categorized as being malicious, removing the application from the computing device or quarantining the application; and
  when the application is categorized as being unwanted, performing at least one of: removing the application from the computing device, notifying a user of the computing device of a presence of the unwanted application on the computing device, providing an option to the user of the computing device for selecting either to keep or remove the unwanted application, and revoking permissions previously granted to the application.

21. The non-transitory computer readable medium of claim 18, wherein the heuristic rules are applied to the gathered set of attributes.

* * * * *